United States Patent [19]
Möltgen et al.

[11] Patent Number: 5,665,127
[45] Date of Patent: Sep. 9, 1997

[54] PROCESS FOR PRODUCING SINTERED α-AL₂O₃ BODIES AND THEIR USE

[75] Inventors: Paul Möltgen, Laufenburg; Pirmin Wilhelm, Bad Säckingen; Josef Schmoll, Goslar, all of Germany

[73] Assignee: H.C. Starck GmbH & Co. KG, Goslar, Germany

[21] Appl. No.: 590,629

[22] Filed: Jan. 24, 1996

[30] Foreign Application Priority Data

Feb. 6, 1995 [DE] Germany .................. 195 03 854.1

[51] Int. Cl.⁶ .................................................. C04B 35/111
[52] U.S. Cl. ...................... 51/293; 501/127; 264/653; 264/662
[58] Field of Search .................. 501/12, 127, 153; 51/293, 309; 264/66

[56] References Cited

U.S. PATENT DOCUMENTS

| | | | |
|---|---|---|---|
| 3,909,991 | 10/1975 | Coes et al. | 51/307 |
| 4,518,397 | 5/1985 | Leitheiser et al. | 51/293 |
| 4,574,003 | 3/1986 | Gerk | 51/309 |
| 4,623,364 | 11/1986 | Cottringer et al. | 51/293 |
| 5,215,551 | 6/1993 | Hatanaka et al. | 51/309 |
| 5,227,104 | 7/1993 | Bauer | 51/309 |
| 5,261,930 | 11/1993 | Fliedner et al. | 51/309 |
| 5,282,875 | 2/1994 | Wood et al. | 51/309 |
| 5,516,348 | 5/1996 | Conwell et al. | 51/309 |

FOREIGN PATENT DOCUMENTS

| | | | |
|---|---|---|---|
| 0324513A1 | 1/1985 | European Pat. Off. | C04B 35/10 |
| 0524436A1 | 6/1992 | European Pat. Off. | C01F 7/02 |
| 2186588 | 11/1986 | United Kingdom | B24D 3/06 |

*Primary Examiner*—Karl Group
*Attorney, Agent, or Firm*—Jerry Cohen

[57] ABSTRACT

Microcrystalline bodies based on α-Al₂O₃ are made by drying sub-micron powders, press compacting and shock sintering at an intermediate sinter temperature range of 1,300° to 1,550° C., i.e. bringing the compact up to such range in under 60 seconds, preferably under 10.

22 Claims, No Drawings

PROCESS FOR PRODUCING SINTERED α-AL$_2$O$_3$ BODIES AND THEIR USE

BACKGROUND OF THE INVENTION

The present invention relates to a process for producing sintered, microcrystalline bodies based on α-Al$_2$O$_3$, and to their use.

One preferred application of α-Al$_2$O$_3$ sintered bodies is their use as abrasive media. In addition to fused corundum abrasive media, such media made of sintered material have already been known for more than 50 years. The usable grades of α-Al$_2$O$_3$ are derived from ones using reduction and/or melting (fusing) methods.

U.S. Pat. No. 3,909,991 describes polycrystalline α-Al$_2$O$_3$ bodies, the crystallite size of which is in the submicron range and the density of which is greater than 95% of the theoretical density. They are produced by hot-pressing a mixture of carbon black and granulated α-Al$_2$O$_3$ bodies which are obtained according to U.S. Pat. No. 3,079,243 by comminuting cold-pressed α-Al$_2$O$_3$ moldings.

More recently, similar sintered abrasive media based on α-Al$_2$O$_3$ have become known which have advantages compared with the known corundum abrasive media due to their microcrystalline structure. Thus an abrasive medium is disclosed in European patent 0 152 768 which is produced at sintering temperatures of about 1400° C. via the sol-gel technique. Crystallization nuclei are added as sintering aids. Similar processes and materials are disclosed in European Application 0 024 099, German Application 3 219 607, U.S. Pat. No. 4,518,397, U.S. Pat. No. 4,574,003, U.S. Pat. No. 4,623,364, and European Applications 0 168 606, 0 200 487, 0 228 856, 0 209 084 and 0 263 810.

A common feature of all the last-mentioned processes is that they are carried out via a sol-gel process using very finely dispersed alumina monohydrate of the boehmite type. The relatively expensive raw materials, which are obtained via the hydrolysis of organic compounds of aluminum, and the energy-consuming process technology cause the cost of sol-gel corundum to increase to many times that of conventional corundum products. Another disadvantage of this process is that the colloidal solutions are for the most part stabilised with relatively large amounts of readily volatile inorganic acids, which leads to processing and environmental problems.

German Patent 3 604 848 describes a process comprising the comminution of a dispersion of alumina-containing raw materials, compounds containing hydrated silica, and other additives (e.g. compounds of the metals Co, Ni, Mg, Cr, Zr, Zn, Si or Ti) to produce a sinterable slip, from which an abrasive medium, the corundum primary crystallites of which have a diameter less than 5 microns, can be produced by drying in stages and sintering at temperatures up to 1700° C. The product obtained in this manner, with its crystallite size of less than 5 microns, still does not have the microstructure of a material which is produced via the sol-gel process using appropriate sintering additives.

Furthermore, compounds containing hydrated silica and which function as sintering aids have to be added according to the process disclosed in German Patent 3 604 848. Mullite is formed from these added compounds on sintering due to their reaction with the alumina. It is known that the effective performance of an abrasive grit is reduced by the presence of silicate phases.

In recent years, numerous abrasive technology investigations on sintered corundum have shown that grinding capacity is inversely proportional to the size of the primary crystals. This means that the finer the microstructure is, the higher the grinding capacity is as a rule.

European Application 0 524 436 discloses a process in which other, inexpensive precursors of alumina (e.g. hydrargillite) are used instead of the expensive boehmite. Suspensions with a solids content between 10 and 40% by weight, which can be processed further analogously to the sol-gel process, are obtained by comminution and subsequent deagglomeration. The residual water also has to be removed in this process, with a very high energy consumption. With the exception of the expensive raw material, the process described in European Application 0 524 436 has all the process technology disadvantages of the sol-gel method.

Compared with the sol-gel process, however, all previously known alternative processes for producing microcrystalline sintered corundum products which start from inexpensive raw materials have the disadvantage that structures are present after sintering which are significantly coarser than those of products obtained via the sol-gel process. The reasons for this are obvious. Sol-gel processes start from particularly finely-divided starting materials which, with the addition of sintering aids, can be dense-sintered at very low temperatures, due to the process employed. Crystal growth is thereby suppressed. In principle, the alternative processes necessitate higher sintering temperatures, which lead to increased crystal growth. Moreover, inhomogeneous and uncontrolled crystal growth is initiated by the phase transformations to α-Al$_2$O$_3$ which occur on sintering. The effective performance of sintered corundum obtained via the alternative processes is thus considerably less than that of sol-gel corundum products.

European Application 0 402 686 discloses a process for obtaining microcrystalline corundum via electrophoretic deposition from an organic suspension containing α-Al$_2$O$_3$. A relatively dense green body can be obtained in this manner, which, despite its dense, homogeneous packing, however, can only be dense-sintered at temperatures of 1600° C., so that this process also results in increased crystal growth. The structure of sintered corundum obtained via electrophoretic deposition is considerably coarser than that of sintered corundum products obtained via the sol-gel process. The effective performance of sintered corundum obtained via electrophoresis is also correspondingly less.

The object of the present invention is thus to demonstrate a process for producing a microcrystalline α-Al$_2$O$_3$ sintered body which does not have the disadvantages of the prior art described above.

SUMMARY OF THE INVENTION

Surprisingly, it has been found that these requirements are fulfilled by a process for producing sintered, microcrystalline bodies based on α-Al$_2$O$_3$ which is characterized in that an α-Al$_2$O$_3$ powder having an average grain size equal to or less than 3 μm as the starting material is comminuted to form a slip having a particle size under 1 μm (micron), the slip is dried to a residual moisture content of equal to or less than 6% by weight, the dried powder is press-compacted to form a green body having a density of equal to or greater than 60% of the theoretical density and is subsequently subjected to shock sintering at temperatures in the range from 1300° to 1550° C. Generally the rise is from room temperature to said range and it occurs in 60 seconds or less, more preferably in 30 seconds or less or still more preferably in 10 seconds or less. But the rise can be from 500° C. or less in such times.

The first process step consists of wet grinding an α-$Al_2O_3$ powder which is already as finely divided as possible. The object of the wet grinding step is to obtain an even finer, very homogeneous α-$Al_2O_3$ suspension having an extremely narrow particle size distribution curve. Wet grinding is advantageously effected in an aqueous medium. In the second step the aqueous suspension obtained on grinding is dried. All drying processes known in the art are suitable for drying. A spray drier may preferably be used. The powder obtained is preferably press-compacted in compactors. Two contra-rotating rolls are used here, the powder being press-compacted in the roll gap under high pressures typically 1000 to 3000 bar.

Preferably suspensions have a bimodal particle size distribution curve can advantageously be used to obtain the dried powder before compaction step. Surprisingly it has been found that even powders with bimodal particle size distributions result in green bodies with exceptionally high densities.

Best results can be obtained with slips of a bimodal particle size distribution with a first maximum in the range between 0.1 and 0.3 μm and the second maximum in the range between 0.2 to 1.0 μm. The particle size distribution is measured by the laser diffraction method (Microtrac Type MIC 2, Micromeritics) in an aqueous solution and $Na_4P_2O_7$ as dispersant. The two peaks of average particle size should be at least 100 nm apart, preferably 200 nm apart. Other multi-modal distribution (e.g. tri-modal) subject to such separation and overall sub-micron size is also feasible. Each of the peaks should represent at least 20% by weight of the material.

Powder is preferably fed to the compactor via a compaction screw. The density of the green body obtained in this manner is greater than 60% of the theoretical density. In the fourth step the green bodies are subjected to shock sintering. Processing and classification to obtain the final abrasive grit are effected by the usual methods.

Starting from inexpensive starting materials, sintered corundum products can surprisingly be obtained by the process according to the invention, the properties of which are comparable with those of sol-gel corundum products. Since the crystate size in the final sintered product substantially depends on the average grain size and on the grain size distribution in the starting material, it is advisable to use types of α-$Al_2O_3$ which are as finely divided as possible, which are then comminuted or deagglomerated to the desired particle size.

Since the grinding performance is inversely proportional to the size of the primary crystals in the sintered product it may be of advantage to mix the starting powder with additional components which act as modifiers, sintering agents and/or grain growth inhibitors which favourably affect the crystal growth.

Suitable additional components acting as modifiers, sintering agents and/or grain growth inhibitors are the oxides of the elements Mg, Co, Ni, Zn, Hr, Ti, Ce, Zr, Cu, Li, Sr, Ba, K, Nb, Si, B, or of the rare earth elements, etc. It is also possible to use combinations of various sintering agents or appropriate precursors which react to give one or more of the abovementioned sintering agents. These additional components are typically present, if at all, as up to 10 weight percent of the body and preferably, but not necessarily, also of sub-micron average particle diameter.

DETAILED DESCRIPTION OF PREFERRED EMBODIMENTS OF THE INVENTION

The solids are preferably ground and/or deagglomerated down to an average particle size of less than 1 μm, most preferably less than 0.4 μm, in order to obtain the desired initial grain size or to separate agglomerates which are present into individual crystallites, respectively. Communication or deagglomeration is preferably effected in vibratory mills, attritors or ball mills. The duration of grinding depends on the initial particle size and on the type of mill used. Although it should be obvious to select a starting material which is as finely divided as possible, economic considerations are often against this, since super-fine aluminas are frequently so expensive that one of the significant advantages of the process according to the invention is lost, namely the use of an inexpensive raw material. Coarser α-$Al_2O_3$ starting powders can also advantageously be used in the process according to the invention, however.

The mount of liquid for wet grinding is preferably selected so that the suspension formed has a solids content of 15 to 80% by weight, preferably 30 to 70% by weight. Water is preferably used as the solvent. It is primarily environmental considerations which stand in the way of other solvents, such as alcohols or acetone, which may also be employed.

Since efforts are most preferably made to produce a sintered body having a primary crystal size of less than 0.4 microns, and crystal growth can be suppressed in the process according to the invention by the correct selection of the sintering temperature, it frequently suffices to continue grinding until the average particle size of the suspension is less than 0.4 microns.

The usual drying methods can be used for drying the suspension. Spray drying processes can be integrated particularly advantageously in a continuous production process. The maximum residual moisture content of the dried product should not exceed 6% by weight, because powder with a higher residual moisture content can only be processed further with difficulty. The slip most advantageously has a residual moisture content of under 1% by weight. α-$Al_2O_3$ powders having a residual moisture content between 0.2 and 3.0% by weight have proved to be particularly advantageous for further processing.

Compaction of the powder may be effected via all the forming processes known in ceramics. Slip casting, cold isostatic pressing, hot pressing, hot isostatic pressing, centrifugal deposition and uniaxial press compaction may be cited as examples, without this being seen as a limitation. In this respect, the green body is preferably press compacted to a density of equal to or greater than 70%, most preferably equal to or greater than 80%, of the theoretical density. Briquetting with the aid of a compactor has been shown to be particularly advantageous. By suitably selecting the compaction rolls, it is even possible substantially to match the shape and size of the pellets produced to their subsequent purpose of use. Subsequent comminution to the desired particle size after sintering can thus be substantially dispensed with. This results in an enormous economic advantage in addition to the obvious saving in energy for a comminution step. This is because this measure enables specific grain sizes to be maintained within a desired band width without a significant fraction of unwanted undersize being produced, as is otherwise usual during processing. Since high-grade sintered corundum products are predominantly used in the coarse grain range, this is a particularly important aspect for their economic success, in addition to quality and production costs. A conventional processing method (grinding and screening) with the usual fractions of fine grain can call the economics of the entire process into question.

Sintering of the green bodies is effected at temperatures between 1300° C. and 1550° C. The requisite sintering temperature is thus considerably below the temperatures of about 1600° C. which are otherwise customary for the sintering of conventional α-Al$_2$O$_3$ ceramics. At the same time, however, the requisite sintering temperature is considerably higher than the temperature required in the sol-gel process, which is preferably below 1300° C. It is thus all the more surprising that the process according to the invention is successful in suppressing crystal growth almost completely. For this purpose it must be ensured, as a further prerequisite, and in addition to the finely divided state and very narrow grain size distribution of the starting powder, that the necessary sintering temperature is reached very rapidly. This means that the green body should reach the hottest zone in the sintering furnace as rapidly as possible. This shock sintering technique enables the sintering process to be completed before crystal growth sets in. At the same time, the sintering process is accelerated due to the good prior compaction. The homogeneous particle size distribution and the fineness of the starting material favour a uniform sintering process in which the primary crystals can be prevented from growing together to form larger crystallites. This homogeneity is consistent with a single mode or multi-modal distribution (bi- or tri-modal).

All types of furnaces or kilns and sintering methods which enable the green body to be suddenly heated up are suitable for sintering. Directly- or indirectly heated rotary kilns, shuffle kilns or sliding batt kilns may advantageously be used. Shock sintering is advantageously effected so that the green body is brought to the requisite temperature in a time equal to or less than 60 seconds, preferably a time equal to or less than 30 seconds, most preferably a time equal to or less than 10 seconds. The soaking time during sintering is a time equal to or less than 60 minutes, preferably a time equal to or less than 30 minutes, and most preferably a time equal to or less than 15 minutes.

After sintering, the abrasive grit is present in the desired grain size and can be classified simply by screening out to produce the final abrasive grit. It may be advantageous, depending on the purpose of use, to carry out an additional comminution step after sintering, in order to obtain sharp cutting edges. This further processing step can be performed quite deliberately under relatively mild conditions, however, so that the aforementioned economic advantage of the process, which is due to the deliberate production of green bodies which cover the desired grain size range, is maintained.

Compared with electrophoresis, the process according to the invention has the advantage that a finer crystallite structure in the final product can be obtained when using starting materials of comparable particle sizes.

Because the fineness of the crystallite structure is directly related to the effective performance of the abrasive grit, an abrasive grit having an increased cutting capacity can be provided by the process according to the invention. Another advantage from an environmental point of view is that the process can be effected using an aqueous medium and environmental pollution due to organic solvents is avoided.

Environmental advantages, which should not be underestimated, also arise compared with the sol-gel process—in addition to the economic advantage due to the use of inexpensive raw materials. Thus relatively large amounts of readily volatile acids are used in the sol-gel process in order to stabilize the suspension. These have to be volatilised during drying and above all during calcination. The preferred acids are nitric or hydrochloric acids. This gives rise to environmental pollution, which still cannot completely be prevented despite expensive technology. Another advantage compared with the sol-gel process is the simplicity of the process according to the invention, which facilitates manufacture in a continuous production operation, which ultimately results in further economic advantages.

The process according to the invention enables high-density, sintered, microcrystalline bodies having a high hardness to be produced, the crystallite size of which can be adjusted between 0.1 and 10 μm. On account of these properties, these sintered bodies are outstandingly suitable as abrasive media, the crystallite sizes for this application being 0.1 to 3 μm.

This invention therefore also relates to the use of the sintered microcrystalline bodies produced according to the invention as abrasive media and for the production of grinding and cutting tools, i.e. tool bits or segments of tool bits.

Because the abrasive properties essentially depend on the crystallite structure of the respective abrasive grit, the process according to the invention enables abrasive grits to be produced for very different specific applications, with a crystallite structure which is the optimum for the application concerned.

The invention is described below by way of the following non-limiting examples:

EXAMPLES

Example 1

α-Al$_2$O$_3$ with an average particle size of 1.5 μm was wet ground in an agitated ball mill to an average particle size (d50) of 280 nm in an aqueous medium. The resulting slurry, which had a solids content of 30% by weight and a d90 of 580 nm, was dried in a spray drier to a residual moisture content of 0.5% by weight. The powder obtained was then briquetted in a compactor at a pressure of 2700 bar. The green bodies produced in the course of this procedure, which had a density of 73% theoretical density (TD), were raised from room temperature to over 1400° C. in under 30 seconds and sintered at 1455° C. in a rotary kiln. The soaking time for the sintering operation was 30 minutes.

The product obtained had a Vickers hardness (HV 0.2) of 21.2 GPa and an average crystallite size of 0.33 μm.

Example 2

α-alumina with an average particle size (d50) of 250 μm was deagglomerated or ground in an agitated ball mill as in Example 1 until the solids fraction of the slurry produced had an average particle size (d50) of 220 nm. The slurry, which had a solids content of 38% by weight and a d90 of 460 nm, was dried in a circulating air drying oven at 80° C. The dried powder was slightly deagglomerated in a mill and briquetted in a compactor. The green bodies obtained, which had a density of 78% TD, were raised from room temperature to over 1400° C. in under 30 seconds and sintered at 1455° C. in a rotary kiln. The soaking time for the sintering operation was 30 minutes.

The product obtained had a Vickers hardness (HV 0.2) of 22.4 GPa and an average primary crystallite size of 0.22 μm.

Example 3

A γ-alumina with an average particle size (d50) of 30 μm was calcined at 1100° C. in a rotary kiln and converted almost completely into the α-form. The product formed in this manner was ground in a jet mill to an average particle size of 1.6 μm. The α-Al$_2$O$_3$ was subsequently wet ground in an agitated ball mill to an average particle size (d50) of 360 nm. The slurry, which had a solids content of 28% by weight and a d90 of 610 nm, was dried in a spray drier to a residual moisture content of 0.5% by weight. The dried powder was briquetted in a compactor. The green bodies produced, which had a density of 75% TD, were raised from room temperature to over 1400° C. in under 30 seconds sintered at 1455° C. in a rotary kiln. The soaking time for the sintering operation was 30 minutes.

The product obtained had a Vickers hardness (HV 0.2) of 21 GPa and an average crystallite size of 0.4 μm.

Grinding tests with the abrasive grits produced according to the invention are described below, compared with prior art abrasive grits.

TABLE 1

(Grinding Test - Fiber disc)

Grinding conditions:

| Material: | Cr—Ni-Steel |
| Grit size: | P 36 |
| Contact pressure: | 60 N |

| Abrasive grit | Abrasion (g) | Grinding performance (%) |
|---|---|---|
| Sol-Gel-corundum according to European Patent O 152 768 | 168 | 100 |
| eutectic alumina zirconia | 127 | 76 |
| electrofused semifriable corundum | 85 | 51 |
| Example 1 | 170 | 101 |
| Example 2 | 184 | 109 |
| Example 3 | 158 | 94 |

TABLE 2

(Grinding Test 2 - Grinding belt)

Grinding conditions:

| Material: | 42 CrMo 4 |
| grit size: | P 36 |
| Contact pressure: | 70 N |
| Grinding time: | 60 min |

| Type of abrasive grit | Abrasion (g) | Grinding performance (%) |
|---|---|---|
| Sol-Gel-corundum according to European Patent O 152 768 | 4122 | 100 |
| eutectic alumina zirconia | 3279 | 80 |
| electrofused semifriable corundum | 2425 | 59 |
| Example 1 | 4098 | 99 |
| Example 2 | 4163 | 101 |
| Example 3 | 4050 | 97 |

TABLE 3

(Grinding Test 3 - Grinding wheel)

Grinding Conditions:

| Material: | 16MnCr5 |
| Grit size: | F60 |
| Advance: | 0,08 mm |
| Grinding area: | 20 mm × 10 mm |

| Abrasive grain | G-Factor | Grinding performance (%) |
|---|---|---|
| Sol-gel corundum according to European Patent O 152 768 | 178 | 100 |

TABLE 3-continued (Grinding Test 3 - Grinding wheel)

Grinding Conditions:

| Material: | 16MnCr5 |
| Grit size: | F60 |
| Advance: | 0,08 mm |
| Grinding area: | 20 mm × 10 mm |

| Abrasive grain | G-Factor | Grinding performance (%) |
|---|---|---|
| Example 1 | 174 | 98 |
| Example 2 | 186 | 104 |
| Example 3 | 163 | 91 |
| White special fused alumina | 51 | 29 |

We claim:

1. A process for producing sintered, microcrystalline bodies based on α-Al$_2$O$_3$, characterized in that the following steps are performed:

(a) deagglomerating or comminuting an α-Al$_2$O$_3$ powder having an average particle size equal to or less than 3 μm as the starting material and adding liquid to form a slip, with said powders comprising the solids content of the slip, with the powders having a particle size under 1 μm, (b) drying the slip to a residual moisture content of equal to or less than 6% by weight to leave a dried powder, (c) press-compacting the dried powder to form a green body having a density equal to or greater than 60% of the theoretical density, and (d) then subjecting the green body to shock sintering at temperatures in the range from 1,300° to 1,550° C., the green body being brought to the sintering temperature from a low temperature of essentially no grain growth to said sinter temperature range in a time equal to or less than 60 seconds, then soaking at such range for under an hour and cooling.

2. A process according to claim 1, wherein the time of bringing the green body to sintering temperature is under 10 seconds.

3. A process according to claim 1, characterized in that the starting powder is mixed with one or more additional components acting as a sinter body modifier, sintering agent and/or grain growth inhibitor, said additional component or components being present in an amount less than 10 weight percent of the green body.

4. A process according to claim 3, wherein the additional components are selected from the oxides of the elements of the group consisting of Mg, Zn, Ni, Co, Hf, Zr, Si, Ti, Cu, Sr, Ba, K, Nb, B rare earth elements and combinations thereof.

5. A process according to claim 1, characterized in that the average particle size of the slip formed is below 0.4 μm.

6. A process according to any of claims 1, 3 or 5, characterized in that the slip has a multi-modal particle size distribution curve with a first maximum in the range between 0.1 to 0.3 μm, and a second maximum in the range between 0.2 and 1.0 μm with a significant separation between such maxima.

7. A process according to claim 6, characterized in that the first maximum is between 0.1 and 0.2 μm.

8. A process according to claim 6, characterized in that the second maximum is between 0.3 and 0.7 μm.

9. A process according to any of claims 1, 3 or 5 characterized in that 20 to 70% by weight of the solids content of the slip calculated as $Al_2O_3$, has a particle size between 0.1 and 0.3 μm and 80 to 30% by weight, of the solids content of the slip, calculated as $Al_2O_3$, has a particle size between 0.2 and 1.0 μm.

10. A process according to claim 9, characterized in that 30 to 50% by weight of the solids content calculated as $Al_2O_3$ has a particle size between 0.1 and 0.3 μm and 80 to 50% by weight of the solids content of the slip, calculated as $Al_2O_3$, has a particle size between 0.2 and 1.0 μm.

11. A process according to any of claims 1, 3 or 5, characterized in that the slip, has a solids content, calculated as $\alpha$-$Al_2O_3$, of 15 to 80% by weight.

12. A process according to claim 10, characterized in that the slip has a solids content, calculated as $\alpha$-$Al_2O_3$, of 30 to 70% by weight.

13. A process according to any of claims 1, 3 or 5, characterized in that the slip is dried to a residual moisture content of under 1% by weight.

14. A process according to any of claims 1, 3 or 5, characterized in that the green body is press-compacted to a density to equal to or greater than 70% of theoretical density.

15. A process according to claim 14, characterized in that the green body is press-compacted to a density equal to or greater than 80% of theoretical density.

16. A process according to claim 1, characterized in that the green body is comminuted and screened before sintering.

17. A process according to any of claims 1,3 or 5, characterized in that the soaking time is equal to or less than 30 minutes.

18. A process according to claim 17, characterized in that the soaking time is equal to or less than 10 minutes.

19. A process for producing sintered abrasive grain and cutting tool materials made $\alpha$-$Al_2O_3$ material with a sintering temperature intermediate the low sintering temperatures of sol-gel derived crystallites and conventional melt-derived or reduction derived crystallites comprising the steps of (a) producing a dispersion in liquid of $\alpha$-$Al_2O_3$ powders or a precursor thereof of average particle size of the powders 90% of under one micron, (b) drying to a residual moisture equal to or less than six percent by weight, (c) compacting the powder to 60% or higher of theoretical density (d) raising the temperature of the compact from under 500° C. to the range of 1,300° to 1,550° C. in under 60 seconds and then (e) soaking at temperature within said range for under one hour and then cooling, the process conditions being controlled to achieve a Vickers hardness (HV 0.2) of at least 16 GPa and average primary crystallite size of under 1 μm in the material.

20. A process according to claim 19, wherein the finished product is further processed to a particle size or shape.

21. A process according to claim 19, wherein the finished product is preshaped and pre-sized, as compacted, and essentially usable without further mechanical sizing or shaping after sintering and cooling.

22. A process according to claim 19, wherein the dispersion has a multi-modal size distribution with at least two peaks separated by at least 100 nm of average particle size.

* * * * *